United States Patent
Messer

(10) Patent No.: US 8,595,371 B2
(45) Date of Patent: Nov. 26, 2013

(54) SENDING A REMOTE USER INTERFACE

(75) Inventor: Alan Messer, Los Gatos, CA (US)

(73) Assignee: Samsung Electronics Co., Ltd., Suwon (KR)

(*) Notice: Subject to any disclaimer, the term of this patent is extended or adjusted under 35 U.S.C. 154(b) by 317 days.

(21) Appl. No.: 12/349,918

(22) Filed: Jan. 7, 2009

(65) Prior Publication Data

US 2010/0077058 A1    Mar. 25, 2010

Related U.S. Application Data

(60) Provisional application No. 61/098,642, filed on Sep. 19, 2008.

(51) Int. Cl.
*G06F 15/16* (2006.01)
*G06F 15/173* (2006.01)
*G06F 17/00* (2006.01)
*H04N 7/16* (2011.01)

(52) U.S. Cl.
USPC ........... 709/230; 709/219; 709/223; 707/607; 705/50; 725/147

(58) Field of Classification Search
USPC ................................................. 709/230–232
See application file for complete search history.

(56) References Cited

U.S. PATENT DOCUMENTS

| | | | | |
|---|---|---|---|---|
| 7,523,158 | B1* | 4/2009 | Nickerson et al. | 709/203 |
| 7,805,523 | B2* | 9/2010 | Mitchell et al. | 709/228 |
| 8,244,843 | B1* | 8/2012 | Primerano et al. | 709/223 |
| 2002/0023092 | A1* | 2/2002 | Tamura et al. | 707/104.1 |
| 2002/0111995 | A1* | 8/2002 | Mansour et al. | 709/203 |
| 2005/0177853 | A1* | 8/2005 | Williams et al. | 725/81 |
| 2005/0210145 | A1* | 9/2005 | Kim et al. | 709/231 |
| 2006/0018209 | A1* | 1/2006 | Drakoulis et al. | 369/30.28 |
| 2008/0275977 | A1* | 11/2008 | Schmidt et al. | 709/223 |

OTHER PUBLICATIONS

Mark R. Walker, PhD, "CEA 2014 Overview", ATIS ITU-T FG IPTV Interoperability Forum, Mountain View, CA, Jan. 24, 2007—10 pages.

* cited by examiner

*Primary Examiner* — Evans Desrosiers
(74) *Attorney, Agent, or Firm* — Kenneth L. Sherman, Esq.; Michael Zarrabian, Esq.; Sherman & Zarrabian LLP

(57) ABSTRACT

In one embodiment, a method for providing a user interface to a client device is provided, the method comprising: sending, to the client device, a browser web page compatible with a browser operable on the client device, the browser web page including a capability to receive content updates from a server according to a server-defined protocol and a capability to send events from the client device to the server; receiving content from a content source; sending the content to the client device according to the server-defined protocol; and sending a partial update of the content to the client device according to the server-defined protocol.

20 Claims, 3 Drawing Sheets

SENDING A REMOTE USER INTERFACE

CROSS REFERENCE TO RELATED APPLICATIONS

This patent application takes priority under 35 U.S.C. 119(e) to U.S. Provisional Patent Application No. 61/098,642, filed on Sep. 19, 2008 entitled "METHOD AND SYSTEM FOR SENDING BITMAP-BASED REMOTE USER INTERFACE USING A WEB BROWSER", by Alan Messer, which is incorporated by reference in its entirety for all purposes.

BACKGROUND OF THE INVENTION

1. Field of the Invention

The present invention relates generally to remote user interfaces. More specifically, browser based arrangements are described for rendering user interfaces that are sent over a network.

2. Description of the Related Art

Remote user interfaces (UIs) are becoming important in various consumer electronics (CE) devices because they permit a remote device to display a user interface for an application that it does not host. For example, in a home setting, a host (e.g. a set top box) located in one room may be arranged to deliver content over a home network to multiple devices including devices that may be located in other rooms within the house. In such settings, it is desirable for a user to be able to interact with the host device through a user interface displayed on the remote device.

To date, there have been a number off efforts to define standards for developing remote user interfaces. Presently, no one remote UI standard works for all situations. Streaming bitmap remote UIs (Intel's XRT, VNC, JPEG2000, etc.) all require a special client in order to decode the stream. HTML UIs work for UIs that can be described as HTML but have difficulty handling UIs that are not readily described using HTML. Video based UIs require expensive video encoders on the server side to create the UI in the first place.

The Consumer Electronics Association (CEA) has a standardization initiative—CEA 2014-A—that is intended to define a web-based protocol and framework for facilitating remote user interfaces. The CEA 2014-A standard defines the mechanisms necessary to allow a user interface to be remotely displayed on and controlled by devices or control points other than the one hosting the underlying logic. The basic device discovery is based on the UPnP Device Architecture for UPnP networks and UPnP devices in the home. The standard also allows the remote display of user interfaces provided by third party internet services on UPnP devices in the home, and covers a wide range of UI capabilities for TVs, mobile hones and portable devices.

Browser based remote user interface systems (such as CEA 2014) typically use HTML to create user interfaces on remote devices in much the same way that web pages are created on a PC screen. One challenge that is faced by browser based remote user interface systems is that they are not well suited for supporting user interfaces that include bitmapped or other non-html components. Service providers are keen for bitmapped UI support because it allows them to promote their brand with their service when it is used remotely by other devices in the home over a home network. Without remote UI support the service providers content would be used without their own user interfaces. Large companies such as cable and phone providers would prefer to grow their business value by utilizing their own user interfaces with their content, whether it be something as simple as displaying a logo with their content or something as complex as a completely unique interactive interface used with their content.

Additionally, many applications have been already written for non-browser environments, such as applications written in Java for mobile phones. Companies would prefer not to have to rewrite these applications in HTML in order for them to work in newer CE devices that utilize HTML. Thus, providing a mechanism for these applications to operate in a browser without significant effort on the part of the developing companies would be beneficial.

In view of the foregoing, mechanisms for more easily facilitating the use of bitmapped images or other non-html content in browser based remote user interfaces would be desirable.

SUMMARY OF THE INVENTION

In one embodiment, a method for providing a user interface to a client device is provided, the method comprising: sending, to the client device, a browser web page compatible with a browser operable on the client device, the browser web page including a capability to receive content updates from a server according to a server-defined protocol and a capability to send events from the client device to the server; receiving content from a content source; sending the content to the client device according to the server-defined protocol; and sending a partial update of the content to the client device according to the server-defined protocol.

In another embodiment, a method for operating a client device, the method comprising: receiving, from a server, a browser web page compatible with a browser operable on the client device, the browser web page including a capability to receive content updates from the server according to a server-defined protocol and a capability to send events from the client device to the server; rendering a remote user interface by running the browser web page in a browser; receiving content from the server and rendering the content in the remote user interface; and receiving a partial update of the content from the server and rendering the partial update in the remote user interface.

In another embodiment, a server is provided comprising: a memory; a processor; an application; and a remote user interface server module configured to: send, to the client device, a browser web page compatible with a browser operable on the client device, the browser web page including a capability to receive content updates from a server according to a server-defined protocol and a capability to send events from the client device to the server; receiving content from a content source; sending the content to the client device according to the server-defined protocol; and sending a partial update of the content to the client device according to the server-defined protocol.

In another embodiment, a client device is provided comprising: a memory; a processor; a web browser configured to: receive, from a server, a browser web page compatible with, the browser web page including a capability to receive content updates from the server according to a server-defined protocol and a capability to send events from the client device to the server; render a remote user interface by running the browser web; receive content from the server and render the content in the remote user interface; and receive a partial update of the content from the server and render the partial update in the remote user interface.

DETAILED DESCRIPTION OF SPECIFIC EMBODIMENTS

Figure 1:
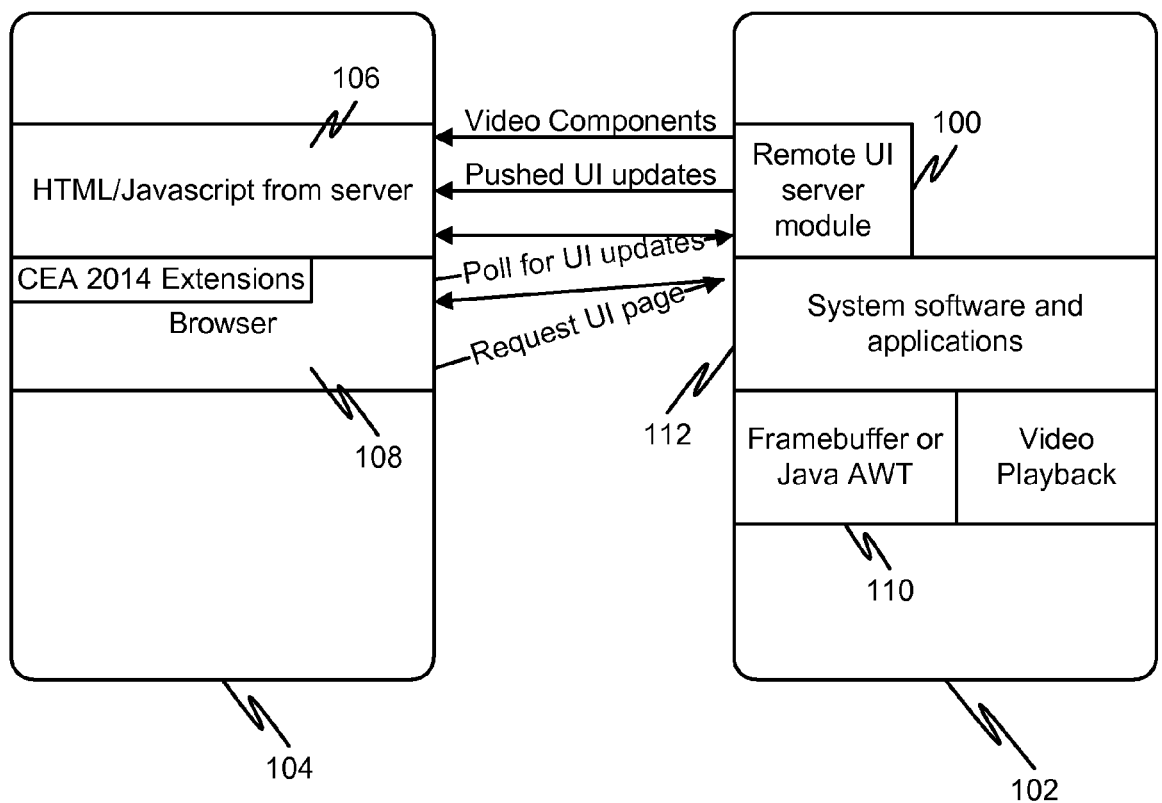
FIG. 1 is a diagram illustrating a server and client in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

For purposes of this document, the term "primitive" UI will refer to a user interface that is incompatible in its present form with a browser that the developer wishes to run it on located at a client device. Examples of primitive UIs include bitmap and other image files, video, and mixed media.

The present invention provides a mechanism which allows a browser based remote user interface system (such as that described in CEA 2014) to support rendering primitive UIs using the same client infrastructure (i.e., a browser). This is important because it allows a CE device to support both bitmap and other primitive based UIs as well as declarative (e.g., HTML) UIs. This can be done without requiring the use of multiple stacks on the client side. On the server side a remote UI generation module may be used to send the appropriate type of data to the client.

At a high-level the described embodiments operate by mapping the bitmap/primitive UI into the support that HTML has while maintaining the quality of the UI rendered as a result. This is possible because HTML UIs support images and image manipulation on the client. This capability is used to render the source bitmap UI on the client device. In addition, the ability of modern browsers to dynamically make requests to the source while a web page is displayed is used to facilitate communications between the server and the client (e.g., technologies such as Asynchronous Javascript and XML (AJAX) and document object model updating). As a result, when bitmap UIs are sent to the client, they only use a small part of the HTML language. When declarative UIs are sent they use declarative sections of HTML (text flows for example) not needed by the bitmap/primitive approach.

In an embodiment of the present invention, when a browser based client device contacts a server with a request that the server determines requires a remote user interface in response, the interface is delivered to the client in the form of a web page. In the described embodiment, the content of the web page includes HTML and JavaScripts—both of which can readily be rendered and/or executed by most modern browsers. Static HTML is used to define components of the remote user interface that are well suited for definition using static HTML. JavaScripts are used to handle and/or update components of the remote user interface (such as bit mapped images) that static HTML is not well suited to handle.

With the described approach, the author of the server has the ability to define the protocols that are appropriate for defining and updating components of the user interface. More specifically, components that are well suited for description in static HTML may be defined using static HTML. JavaScripts that are embedded in the in the delivered webpage can be used to handle components of the remote user interface that are not well suited for definition in static HTML. This is particularly useful because it provides the server author with a great deal of flexibility in defining how partial updates to server images are handled. This contrasts with most existing remote user interface protocols where a fixed protocol effectively dictates that manner in which partial updates of server images are handled.

As will be appreciated by those of ordinary skill in the art, several standard protocols exist that can send partial updates of server images to a client to recomposite into an image. Examples of these protocols include: Microsoft's RDP, Intel's XRT, Olivetti's VNC and others. Each of these protocols provides a transport protocol for sending full and parts of the image in a responsive fashion from the server to the client. They also feedback key presses from a keyboard/mouse to the server. This present invention differs from these types of protocols in that screen changes for bitmapped UIs are sent and rendered using web technologies and browsers. Other features of the described system include the ability for the server to send partial updates, since it can send a JavaScript page to process the data that is sent. This allows the server vendor a wide degree of flexibility in deciding the manner in which partial updates are sent (i.e., the protocol by which updates are sent is not fixed).

FIG. 1 is a diagram illustrating a server and client in accordance with an embodiment of the present invention. A server vendor writes a software module 100 suitable for execution as a server 102 that is designed to perform two types of action. First, the server module 100 is arranged to send Javascript code that is used to recomposite content. Second, the server is arranged to send the content to the client. A wide variety of mechanisms may be used to accomplish this function. When it is desirable to include one or more video streams in the user interface, the video stream(s) is/are sent in a conventional manner (e.g., no effort is made to convert the video stream to a bitmap). Any desired overlay graphics are sent to the client as a separate component. The video and overlay graphics are then composited on the client device 104. The server 102 is also preferably arranged to send partial image updates to the client in the form of image files (JPEG, PNG, etc.). As will be described in more detail below, the server author has a great deal of latitude in defining the protocol by which such updates are sent. A simple example may be to tile the remote UI and to only send the updated tiles to the client.

The Javascript code sent from the server is configured to (i) receive the image updates, HTML and/or and full content above according to the chosen server-defined protocol; and (b) send events (e.g. keystrokes, cursor movements, etc.) from the client 104 to the server 102 to allow the server 102 to mimic a local interaction.

With the described arrangement, the client 104 only needs to run web browser software 106 with suitable codecs to decode the received images, audio and video.

In a typical application, the user may decide to connect to the UI by selecting a 'browse' screen on the client device 104 and seeing, through, e.g., home network discovery, that the server 102 is making available a remote UI. The user then selects the remote UI 100 and the browser 108 requests the web page from the server 102. This returns the server's preferred page for creating the remote UI to the browser 108. The browser 108 then renderers the UI according to the HTML and JavaScript embedded in the page received from the server.

It should be appreciated that a variety of mechanisms may be used to render the desired content. A few common embodiments are described here. For example, in some embodiments, the HTML may be arranged to describe two layers. A first one of the layers may be a full-screen video object that is created to pull a video stream of the UI from the server. A variety of different video streaming protocols may be used to define the images, as for example JPG2000, MPEG-2, MPEG-4, animated GIF, etc.

The second layer may be an overlay layer that is described as a matrix of tile images described in HTML. For example, a full screen table may be created in the HTML, with the table being divided into fixed size image cells (e.g., a matrix of 32×32 images). Each entry in the table includes a URL that identifies the location of the image to be used in the corresponding tile/cell location. When the client browser receives the table, it requests the various tile images identified in the table using the URLs provided (e.g., http://serverip/images?row=1&column=1). The server then sends the requested image in a simple image format (e.g. bmp). The browser then renders the received images and the initial state of the user interface is complete. This would allow, for example, the server to provide a video feed to the client that would then be overlaid with a user interface such as logos, ads, etc.

In order for the user to be able to interact with the user interface, it is important that the server and the client be synchronized in their understanding of the current state of the user interface displayed on the client. A frame buffer 110 may be utilized on the server side 102 to store/replicate the image that is to be displayed on the client 104. When a frame buffer 110 is used, the URLs provided for the tile images may be directed to the part of the frame buffer 110 associated with the respective tiles. When the application 112 running on the server makes a change to the user interface, both the frame buffer 110 and the client 104 must be updated. The frame buffer 110 may be arranged to monitor changes made by the application 112, or the application 112 may be arranged to notify the frame buffer 110 of changes or otherwise implement the changes in the frame buffer 110.

The change also must be sent to the client. This may be accomplished by informing the client of the position(s) of the image tile(s) that has/have changed. The HTML/JavaScript on the client takes this information and loads the image into the right table tile position on the client's display.

It should be appreciated that HTTP is generally a "pull" based technology. That is, generally a client must open a connection and ask for particular information which is delivered by the server as requested. Servers are generally not arranged to open connections with clients to "push" information from the server to a client. This presents a challenge when using HTTP as the transport protocol for communications between the server and client in the context of a remote user interface. This is because when the server determines that a change must be made to the remote user interface, it has to be able to inform the client browser of the change. In some embodiments, an XMLHttpRequest may be used to facilitate notifying the client of change. An XMLHttpRequest (XHR) is an HTTP API that can be used by JavaScript and other web browser scripting languages to transfer XML and other text data between a server and a browser. One characteristic of an XMLHttpRequest is that it can operate asynchronously. Therefore, the HTML code that is part of the web page originally delivered to the client is arranged to open a XMLHttpRequest connection to the server when the web page is loaded. The XMLHttpRequest is left open so that the server can notify the client of updates. As mentioned above, the updates may be sent as an indication of the image tiles that have been changed, and responsive to the change notification, the client browser requests the updated tile(s) from the frame buffer and updates the user interface accordingly.

Generally, an XMLHttpRequest is closed when a response is received. Therefore, after each update is received, the browser must be arranged to open a new XMLHttpRequest connection in order to facilitate continued updates. However, if other mechanism are, or become available to create a more persistent connection between the client and server, such arrangements may readily be used to facilitate informing the client of any updates when desired. An example of another such mechanism is a feature of CEA 2014 called NotifSocket, which keeps the connection open and allows updates to be pushed to the client from the server.

Another common implementation of an HTML based remote user interface may be to define a single table. In such an embodiment, a full screen table having a single full screen cell may be created in HTML. In this embodiment, the downloaded web page includes a URL that identifies a full screen image (e.g.: http://serverip/images?x=1&y=1&width=640&height=480). When the page is downloaded, the cell requests a full-screen image using the URL provided. In response, the server sends the requested image in a simple image format (e.g. bmp). As before, the image may be stored in a frame buffer within the server that expresses the image needed. Also, as before, the HTML code running on the client opens a connection to the server and the server may be arranged to monitor changes made by the application 112 to facilitate updating the frame buffer as appropriate.

When a change occurs, information indicative of the region of the cell that has changed can be sent to the client browser through the XmlHTTPRequest connection. Again, this can be accomplished by sending a URL that indicates the region that contains the change or by other appropriate mechanism. On the client side, the HTML/JavaScript takes this information and updates the table to incorporate the changes.

The changes can be implemented in a variety of ways. For example, in some implementations, the update may be layered on top of the original image. Such layering works well when relatively few changes are made, but it becomes a bit more complicated if and when a large number of changes are layered on top of the original image. Accordingly, if a layered rendering approach is elected it may be desirable to take some measure to facilitate renewing the entire image as appropriate to prevent the layer stack from growing too big.

Another approach to updating a single image would be to divide the image into tiles that match the static and changing regions of the image. The changed region of the image is updated (e.g., by referencing the appropriate segment of the frame buffer) while the remainder of the image remains the same. The same technique is then used for subsequent updates, with the change tiling being customized from the full image based on each update. Each new table element is updated with the right image reference and the client loads the image into the right table tile position. Of course, other updating approaches may be used as well.

While the HTML and JavaScript render the content, any keyboard or cursor inputs (generally referred to as keyboard inputs) also must be captured by the browser. It should be appreciate that a variety of mechanisms may be used to capture the keyboard inputs. For example, one suitable approach is to use an overlay key capture layer. In one such implementation, a second fully transparent layer is created on top of the image layer. The overlay key capture layer has callbacks for JavaScript key handlers. In such an arrangement, each JavaScript handler may be arranged to generate an XmlHTTPRequest or hidden frame request to the user. For each request the keystroke or mouse data is passed as part of the URL. (e.g. http://serverip/keys?x=100&y=100). When the XmlHTTPRequest is received at the server, the server passes the decoding key input to the local application.

Another suitable approach for capturing keystrokes would be to utilize key capture on a per object basis. In one such implementation, JavaScript key handlers are created for each UI element on the screen. In tiled images, there could be one key handler for each tile image. In this implementation, each JavaScript handler causes an XmlHTTPRequest or hidden frame request to be generated. For each request the keystroke or mouse data is passed to the server as part of the URL. (e.g. http://serverip/keys?x=100&y=100). When the server receives the URL, it decodes the key and passes the decoding key input to the local application.

The description set forth above outlines some common means of sending partial updates. However, it should be appreciated that many others update protocols can be utilized based on various desired optimizations and use of HTML layout.

It should be appreciated that CEA 2014 uses HTML to create user interfaces on remote devices in the same way that web pages are created on a PC screen. This invention assumes that a mechanism such as CEA2014 is used for sending HTML UIs. This application describes how to use existing technology, such as CEA2014, to send bitmap-based remote UIs to remote devices using HTML as a basis.

A significant difference between prior art techniques and the present invention is that the code to recompose content on the client is controlled/created by the server, as opposed to being fixed. Another significant different is that the platform that is utilized can be a standard web browser on the client.

In one embodiment, the server contains a processor and a memory for performing the various processes described herein. Likewise, the client device also can contain a processor and memory for performing the various processes described herein. An example of a server is a cell phone or other mobile device and an example of a client is a television or set top box.

Figure 2:
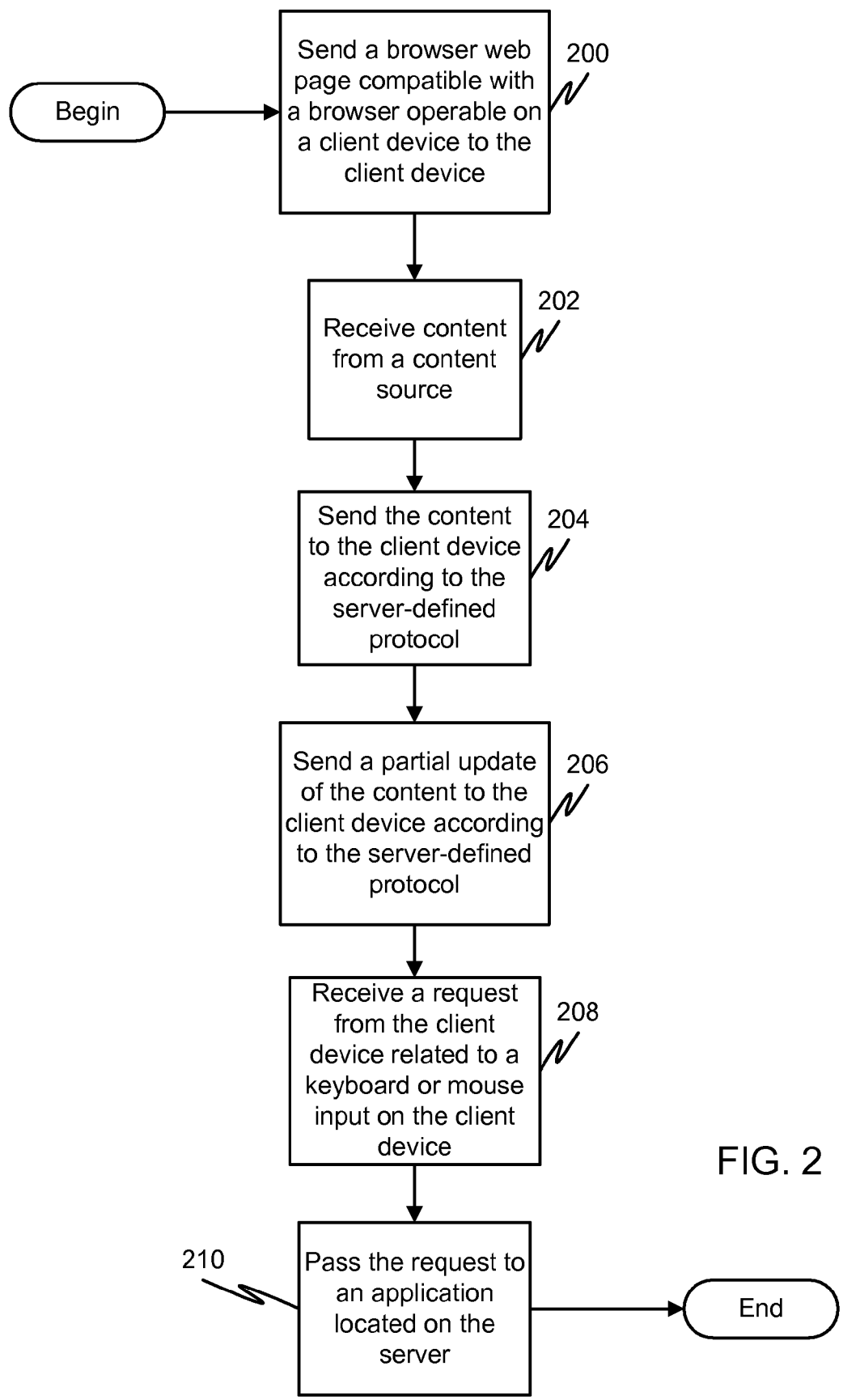
FIG. 2 is a flow diagram illustrating a method for providing a user interface to a client device in accordance with an embodiment of the present invention.

FIG. 2 is a flow diagram illustrating a method for providing a user interface to a client device in accordance with an embodiment of the present invention. This method represents process steps undertaken on the "server side," namely steps taken at a device that operates a remote user interface server or similar module. At 200, a browser web page compatible with a browser operable on a client device is sent to the client device. The browser web page includes a capability to receive content updates from a server according to a server-defined protocol (such as codecs) and a capability to send events from the client device to the server (such as a Javascript script). At 202, content is received from a content source. In one implementation, a video stream is being sent over the link and the content described in the process of FIG. 2 represents an image overlay for the video stream. In an alternative implementation of the present invention, the content is an image. At 204, the content is sent to the client device according to the server-defined protocol. In one implementation, this might include splitting the content (image) into multiple tiles and sending the multiple tiles to the client device for display in a table. In another implementation, the image may simply be sent as a whole for inclusion in a table on the client side. At 206, a partial update of the content is sent to the client device according to the server-defined protocol. In the implementation where the image was split into multiple tiles, the partial update may simply be a replacement for one of the multiple tiles. In the implementation where the image was sent as a whole, the partial update may simply be an indication of a region of the image that has changed.

At 208, a request may be received from the client device related to a keyboard or mouse input on the client device. At 210, the request may be passed to an application located on the server.

Figure 3:
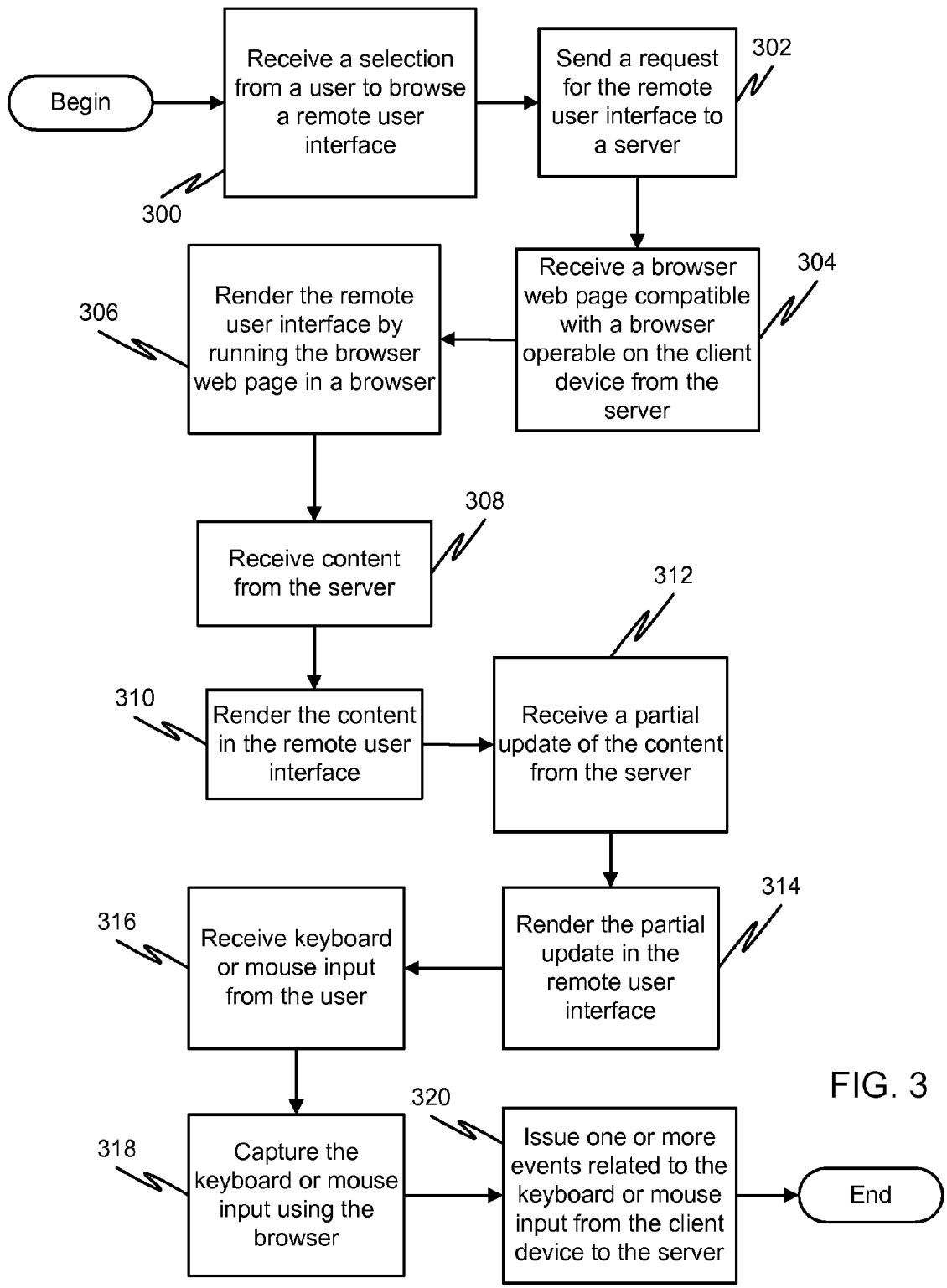
FIG. 3 is a flow diagram illustrating a method for operating a client device in accordance with an embodiment of the present invention.

FIG. 3 is a flow diagram illustrating a method for operating a client device in accordance with an embodiment of the present invention. This method represents process steps undertaken on the "client side," namely steps taken at a device that operates a remote user interface client or similar module. At 300, a selection may be received from a user to browse a remote user interface. At 302, a request for the remote user interface may be sent to a server. At 304, a browser web page compatible with a browser operable on the client device is received from the server. The browser web page includes a capability to receive content updates from the server according to a server-defined protocol (such as codecs) and a capability to send events from the client device to the server (such as a Javascript script). At 306, a remote user interface is rendered by running the browser web page in a browser. At 308, content is received from the server. In one implementation, a video stream is being sent over the link and the content described in the process of FIG. 3 represents an image overlay for the video stream. In an alternative implementation of the present invention, the content is an image. At 310, the content is rendered in the remote user interface. In one implementation, this might include rendering a first layer including a video stream and then rendering a second layer including graphics to overlay the video stream. In another implementation, multiple tiles received from the server are rendered, wherein the multiple tiles represent pieces of a single image. In another implementation, a single image received from the server is rendered in a table. At 312, a partial update of the content is received from the server. In the implementation where the first layer is a video stream, the partial update may reflect an update to the second layer. In the implementation where the content was rendered using multiple tiles, the partial update may reflect an updated one of the multiple tiles. In the implementation where the content was rendered as a single image, the partial update may reflect an updated region of the image. At 314, the partial update is rendered in the remote user interface.

At 316, a keyboard or mouse input is received from a user. At 318, the keyboard or mouse input is captured using the browser. At 320, one or more events related to the keyboard or mouse input are issued from the client device to the server.

In one embodiment, this partial update is "pushed" to the client, meaning that the partial update is initiated in response to the receipt of the content at the server device, as opposed to the alternative embodiment where the client device requests a partial update (periodically sending requests, perhaps) from the server device.

One of ordinary skill in the art will recognize that the term "television" should be interpreted broadly to include devices hooked up to a traditional television, such as a set-top-box and/or media server, and the term should not be restricted to only the "box" containing the display.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for providing a user interface to a client device, the method comprising:
    sending, to the client device, a browser web page compatible with a browser operable on the client device, wherein the browser web page is configured to receive user interface primitive updates from a server according to a protocol defined by the server, wherein the browser web page is further configured to send events from the client device to the server, wherein the user interface primitive updates are updates to primitive elements of the user interface, and wherein the primitive elements are incompatible with the browser without the browser web page;
    receiving a user interface primitive from a content source, wherein the user interface primitive includes data for rendering content;
    sending the user interface primitive to the client device according to the server-defined protocol, wherein, based on the server-defined protocol, the data included in the user interface primitive is sent to the client device either as a whole or as multiple parts obtained from splitting the data, and wherein the browser web page renders, based on the user interface primitive, the content in the user interface; and
    sending a partial update of the user interface primitive to the client device according to the server-defined protocol, wherein the partial update includes content update for a portion of the content, and wherein the browser web page renders the content update in the user interface.

2. The method of claim 1, further comprising:
    receiving, from the client device, a request for updated user interface primitives, wherein the request is generated when the browser web page sends events to the server;
    wherein the events sent to the server include at least one of a Javascript script and a user input.

3. The method of claim 2, wherein the sending a partial update includes sending the partial update when the server receives the partial update.

4. The method of claim 1, wherein the user interface primitive updates received from the server further include one or more codecs.

5. The method of claim 1, further comprising:
    the server determining a manner for sending partial updates of the user interface primitives to the client device;
    wherein the server-defined protocol represents the manner that the server has determined for sending partial updates of the user interface primitives to the client device.

6. The method of claim 1, further comprising:
    sending a first layer to the client device, wherein the first layer includes a video stream;
    wherein the user interface primitives represent a second layer; and
    wherein the second layer includes graphics to overlay onto the video stream.

7. The method of claim 1, wherein:
    the content rendered on the user interface is an image;
    the sending the user interface primitive to the client device according to the server-defined protocol comprises:
        splitting the image into multiple tiles; and
        sending the multiple tiles to the client device, wherein the browser web page renders the multiple tiles in a table of the user interface; and
    the sending a partial update of the user interface primitive to the client device according to the server-defined protocol comprises sending a replacement tile for one of the multiple tiles to the client device, wherein the browser web page renders the replacement tile in the table.

8. The method of claim 1, wherein:
    the content rendered on the user interface is an image;
    the sending the user interface primitive to the client device according to the server-defined protocol comprises sending the image to the client device, wherein the browser web page renders the image in a table of the user interface; and
    the sending a partial update of the user interface primitive to the client device according to the server-defined protocol comprises sending a region of the image that has been updated to the client device, wherein the browser web page renders the updated region of the image in the table.

9. The method of claim 1, further comprising:
    receiving a request from the client device related to a user input on the client device; and
    passing the request to an application located on the server;
    wherein the user input includes at least one of a keyboard input and a mouse input.

10. A method for operating a client device, the method comprising:
    receiving, from a server, a browser web page compatible with a browser operable on the client device, wherein the browser web page is configured to receive user interface primitive updates from the server according to a protocol defined by the server, wherein the browser web page is further configured to send events from the client device to the server, wherein the user interface primitive updates are updates to primitive elements of a remote user interface, and wherein the primitive elements are incompatible with the browser without the browser web page;
    rendering a remote user interface by running the browser web page in a browser;
    receiving a user interface primitive from the server according to the server-defined protocol, wherein the user interface primitive includes data for rendering content, and wherein, based on the server-defined protocol, the data included in the user interface primitive is received either as a whole or as multiple parts obtained from splitting the data;
    rendering the user interface primitive in the remote user interface, wherein the browser web page renders, based on the user interface primitive, the content in the remote user interface;

receiving a partial update of the user interface primitive from the server according to the server-defined protocol, wherein the partial update includes content update for a portion of the content; and rendering the partial update in the remote user interface, wherein the browser web page renders the content update in the remote user interface.

11. The method of claim 10, further comprising:
receiving a user selection to browse a remote user interface; and
sending a request for the remote user interface to the server.

12. The method of claim 10, wherein:
the user interface primitive updates received from the server further include one or more codecs; and
wherein the events sent to the server include at least one of a Javascript script and a user input.

13. The method of claim 10, further comprising:
the server determining a manner to send partial updates of the user interface primitives to the client device;
wherein the server-defined protocol represents the manner that the server has determined for sending partial updates of the user interface primitives to the client device.

14. The method of claim 10, wherein:
the rendering the user interface primitive includes:
 rendering a first layer, wherein the first layer includes a video stream; and
 rendering a second layer, wherein the second layer includes graphics to overlay onto the video stream; and
the rendering the partial update includes rendering an updated portion of the second layer.

15. The method of claim 10, wherein:
the content rendered on the remote user interface is an image;
the receiving the user interface primitive from the server according to the server-defined protocol comprises receiving multiple tiles, wherein each tile represents a piece of the image;
the rendering the user interface primitive in the remote user interface comprises the browser web page rendering the multiple tiles in a table of the remote user interface;
the receiving the partial update of the user interface primitive from the server according to the server-defined protocol comprises receiving a replacement tile for one of the multiple tiles; and
the rendering the partial update comprises the browser web page rendering the replacement tile in the table.

16. The method of claim 10, wherein:
the content rendered on the remote user interface is an image;
the receiving the user interface primitive from the server according to the server-defined protocol comprises receiving the image;
the rendering the user interface primitive in the remote user interface comprises the browser web page rendering the image in a table of the remote user interface;
the receiving the partial update of the user interface primitive from the server according to the server-defined protocol comprises receiving an updated region of the image; and
the rendering the partial update comprises the browser web page rendering the replacement updated region of the image in the table.

17. The method of claim 10, further comprising:
receiving a user input on the client device;
capturing the user input using the browser; and
issuing one or more events related to the user input from the client device to the server;
wherein the user input includes at least one of a keyboard input and a mouse input.

18. The method of claim 10, further comprising:
periodically polling the server for partial updates.

19. A server comprising:
a memory;
a processor;
an application; and
a remote user interface server module configured to:
 send, to the client device, a browser web page compatible with a browser operable on the client device, wherein the browser web page is configured to receive user interface primitive updates from a server according to a protocol defined by the server, wherein the browser web page is further configured to send events from the client device to the server, wherein the user interface primitive updates are updates to primitive elements of the user interface, and wherein the primitive elements are incompatible with the browser without the browser web;
 receiving a user interface primitive from a content source, wherein the user interface primitive includes data for rendering content;
 sending the user interface primitive to the client device according to the server-defined protocol, wherein, based on the server-defined protocol, the data included in the user interface primitive is sent to the client device either as a whole or as multiple parts obtained from splitting the data, and wherein the browser web page renders, based on the user interface primitive, the content in the user interface; and
 sending a partial update of the user interface primitive to the client device according to the server-defined protocol, wherein the partial update includes content update for a portion of the content, and wherein the browser web page renders the content update in the user interface.

20. A client device comprising:
a memory;
a processor;
a web browser configured to:
 receive, from a server, a browser web page compatible with the web browser, wherein the browser web page is configured to receive user interface primitive updates from the server according to a protocol defined by the server, wherein the browser web page is further configured to send events from the client device to the server, wherein the user interface primitive updates are updates to primitive elements of a remote user interface, and wherein the primitive elements are incompatible with the browser without the browser web page;
 render a remote user interface by running the browser web page in the web browser;
 receive a user interface primitive from the server according to the server-defined protocol, wherein the user interface primitive includes data for rendering content, and wherein, based on the server-defined protocol, the data included in the user interface primitive is received either as a whole or as multiple parts obtained from splitting the data;
 render the user interface primitive in the remote user interface, wherein the browser web page renders, based on the user interface primitive, the content in the remote user interface; and receive a partial update of the user interface primitive from the server according to the server-defined protocol, wherein the partial update includes content update for a portion of the content; and render the partial update in the remote user interface, wherein the browser web page renders the content update in the remote user interface.

\* \* \* \* \*